(12) United States Patent
Fritsch

(10) Patent No.: US 8,777,537 B2
(45) Date of Patent: Jul. 15, 2014

(54) FASTENER WITH SHEAR BUSHING

(75) Inventor: Theodore J. Fritsch, Indianapolis, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 914 days.

(21) Appl. No.: 12/317,197

(22) Filed: Dec. 19, 2008

(65) Prior Publication Data

US 2009/0169324 A1 Jul. 2, 2009

Related U.S. Application Data

(60) Provisional application No. 61/009,133, filed on Dec. 26, 2007.

(51) Int. Cl.
| F16B 5/02 | (2006.01) |
| F16B 37/12 | (2006.01) |
| F16B 43/00 | (2006.01) |

(52) U.S. Cl.
CPC ............... *F16B 5/02* (2013.01); *F16B 37/122* (2013.01); *F16B 43/00* (2013.01)
USPC ........................................ 411/338; 411/546

(58) Field of Classification Search
CPC ...... B15B 5/02; B15B 37/145; B15B 37/122; B15B 43/00
USPC ..................... 411/338, 339, 186–188, 546
See application file for complete search history.

(56) References Cited

U.S. PATENT DOCUMENTS

| 780,526 | A | * | 1/1905 | Reitz ................... 30/266 |
| 889,966 | A | * | 6/1908 | Rausch ................ 30/270 |
| 953,298 | A | * | 3/1910 | Schmidt .............. 411/338 |
| 1,194,792 | A | * | 8/1916 | Stewart ............... 411/338 |
| 1,616,232 | A | * | 2/1927 | Roberts et al. ....... 411/338 |
| 2,386,729 | A | * | 10/1945 | Watter ................ 411/338 |
| 2,516,537 | A | * | 7/1950 | Wetzel et al. ........ 384/416 |
| 2,700,172 | A | * | 1/1955 | Rohe ................... 16/2.1 |
| 2,957,196 | A | * | 10/1960 | Delgadillo et al. ..... 16/2.1 |
| 3,096,678 | A | * | 7/1963 | Devine et al. ......... 411/64 |
| 3,503,224 | A | | 3/1970 | Davidescu |
| 3,693,247 | A | | 9/1972 | Brown |
| 3,703,741 | A | * | 11/1972 | Foster et al. .......... 16/438 |
| 3,771,410 | A | * | 11/1973 | Swindt, II ............ 411/338 |
| 3,835,615 | A | * | 9/1974 | King, Jr. .............. 403/408.1 |
| 4,019,414 | A | | 4/1977 | Thomas, Jr. et al. |
| 4,765,787 | A | | 8/1988 | Briles |
| 5,205,667 | A | * | 4/1993 | Montgomery, Sr. ... 403/151 |
| 5,609,434 | A | * | 3/1997 | Yehezkieli et al. .... 403/260 |
| 6,138,434 | A | | 10/2000 | Demars et al. |
| 6,457,937 | B1 | | 10/2002 | Mashey |
| 6,789,993 | B2 | * | 9/2004 | Ozawa et al. ........ 411/546 |
| 6,991,397 | B2 | | 1/2006 | Welch |
| 7,093,819 | B1 | | 8/2006 | Hall et al. |
| 2002/0050105 | A1 | | 5/2002 | McCorkle et al. |
| 2002/0131842 | A1 | | 9/2002 | Eriksson |
| 2002/0172576 | A1 | | 11/2002 | Keener |

* cited by examiner

*Primary Examiner* — Flemming Saether
(74) *Attorney, Agent, or Firm* — Krieg DeVault, LLP

(57) ABSTRACT

A fastener is disclosed including a threaded male fastener and a shear bushing for coupling thin walled structures together. The shear bushing having an internal through opening and a shear ring constructed to project across an interface of adjacent walls is operable for absorbing shear loads transmitted into the fastener from a fastened structure. The male fastener includes a threaded portion extending through the shear ring for engaging a threaded female receiver.

24 Claims, 5 Drawing Sheets

FASTENER WITH SHEAR BUSHING

CROSS REFERENCE TO RELATED APPLICATIONS

The present application claims the benefit of U.S. Provisional Patent Application 61/009,133, filed Dec. 26, 2007, and is incorporated herein by reference.

GOVERNMENT RIGHTS

The present application was made with the United States government support under Contract No. N00019-02-C-3003, awarded by the U.S. Navy. The United States government has certain rights in the present application.

FIELD OF THE INVENTION

The present invention relates to a fastener having a shear bushing operable to carry shear loading for the fastener.

BACKGROUND

Threaded fasteners connect and hold separate structures together in a variety of ways. Fasteners are designed to carry a tension load along their longitudinal length to prevent separation of the structures. Sometimes loading on the fastened structures includes a large shear force in addition to normal separating forces. It has been found that fasteners in certain applications are not well suited to carry large shear loads. The present invention overcomes this and other problems associated with some prior art fasteners.

SUMMARY

A fastener is disclosed including a threaded male fastener and a shear bushing for coupling thin walled structures together. The shear bushing having an internal through opening and a shear ring constructed to project across an interface of adjacent walls is operable for absorbing shear loads transmitted into the fastener from a fastened structure. The male fastener includes a threaded portion extending through the shear ring for engaging a threaded female receiver.

For certain applications that include thin walled structures and/or areas of fastening that are space constrained the present invention provides a novel and nonobvious solution to the shear loading problem. Further embodiments, forms, features, aspects, benefits, and advantages shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
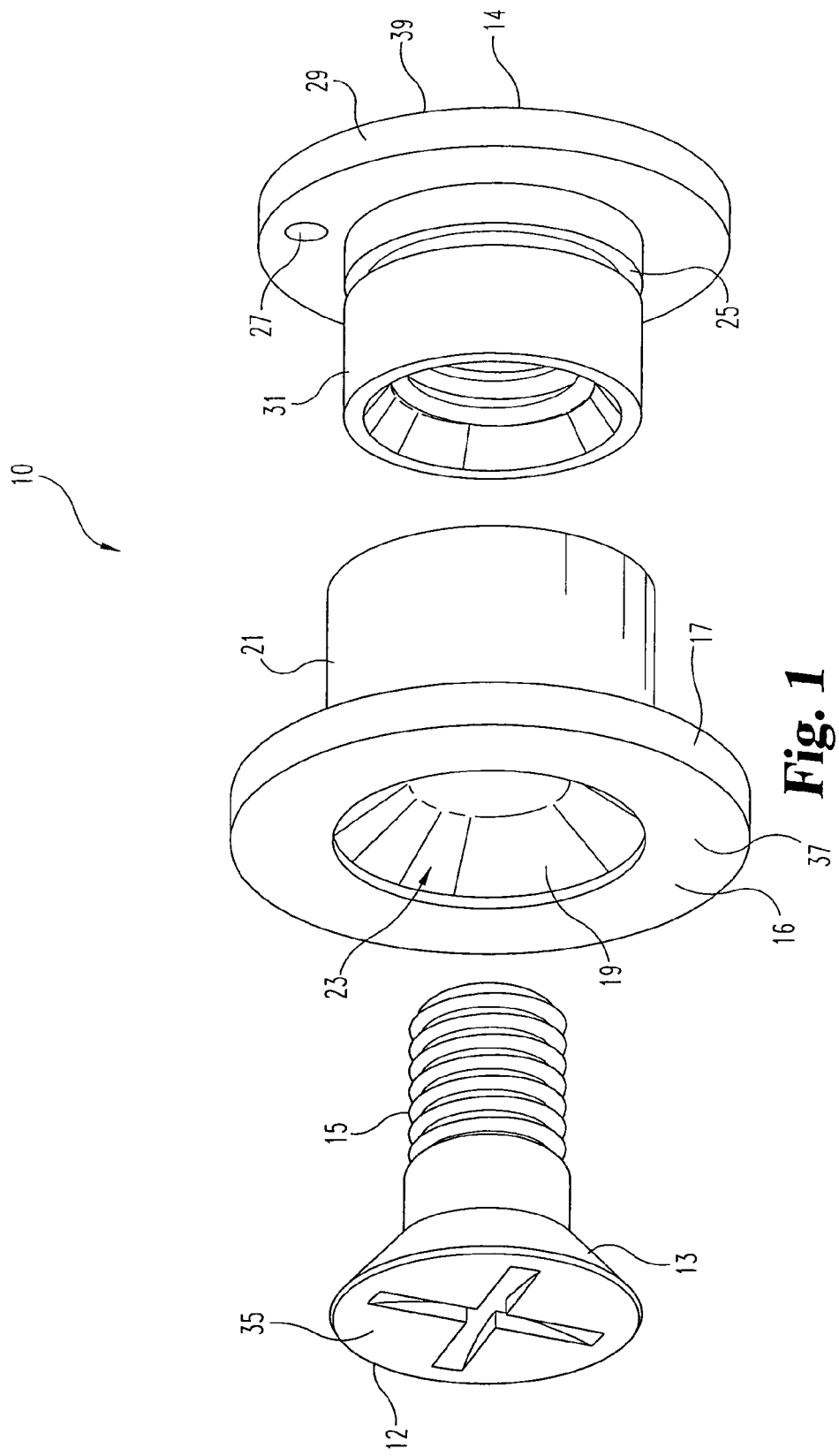
FIG. 1 is a perspective view of a fastener according to the present invention.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Threaded fasteners must be capable of carrying loads transmitted between the components being fastened together. Typical loading on male fasteners can include tension, bending and shear loads. Tension loading acts along the longitudinal axis of the shank of the bolt and causes the fastener to stretch or elongate. Bending loads act to produce both compression loading and tension loading on separate portions of the shank of a male fastener. Shear loading acts laterally across the shank of the fastener in a direction which is substantially normal to the longitudinal axis. The reaction point of the shear loading on the fastener is located at the interface point of two components. Shear loading can be generated by external opposing forces urging each component to move in a lateral direction relative to the fastener.

It has been found that it is undesirable to load a threaded fastener in shear across the treaded portion due to the stress risers created by the threads. Shear stress acting through the threaded portion causes the fastener to fail at a lower stress level than a similar fastener loaded in shear across a nonthreaded portion of the shank. Another problem with shear loading across the threads of a fastener is that the threads may deform and render the fastener unsuitable for reuse.

Another design guideline for certain high value applications having weight constraints requires a minimum distance between through holes in a structure loaded in shear. The guideline requires that the distance between through holes not be closer than four times the diameter of the shank of the male fastener. For example, a ¼ inch fastener requires at least a 1.0 inch distance between the holes. Therefore in space constrained applications a designer is limited on the number of fasteners and/or the size of the fasteners used.

In certain applications where the ends of the fastener are required to be installed flush with the outer walls of the components, the threaded portion of a standard fastener may cross the interface between the two components and thus be subjected to shear loading acting through the components. Because threaded fasteners require a minimum amount of thread engagement to remain fastened, a flush mount application will necessarily cause the threaded portion of a male fastener to extend across the interface of certain thin wall components. For purposes of this application a "thin wall" is defined as a wall having a width that is smaller than the length of the threaded portion of the fastener. Furthermore the term "flush" in this application is construed to mean that an outermost surface of the ends of the fastener is substantially even or slightly recessed with respect to the outermost surface of the outer walls of the components.

It should be understood that while two thin walled structures are generally shown in the illustrative embodiments that the fastener of the present invention can operate to fasten three or more structures together. Because shear loads are generated at the interface of two adjacent structures, applications having three or more structures fastened together will produce two or more locations of shear loading on the fastener. Also, uses of words such as "walls," "structure," "components," and the like should be viewed as generic descriptors and can be used interchangeably with one another in the present application.

Referring to FIG. 1, an exemplary embodiment of a fastener 10 is illustrated according to the present invention. The fastener 10 includes a threaded male fastener 12, a threaded female receiver 14 and a shear bushing 16. Although the female receiver 14 is shown as a separate threaded nut in the illustrative drawing, the receiver 14 of the present invention can include any component having female threads such as a nut, an insert or other tapped aperture in a structure. The threaded male fastener 12 threadingly engages with a threaded female receiver 14 in a convention manner. The fastener 10 includes a shear bushing 16 operable to absorb substantially the entire shear loading transmitted between a structure and the fastener 10.

The threaded male fastener 12 includes a head 13 for receiving a torque delivering drive tool and a threaded shank 15 extending from the head 13. The female receiver 14 can include a lock feature 25 such as an ovalized portion to prevent the threaded fastener from loosening inadvertently. An anti-torque feature 27 such as an aperture can be formed on a flange 29 for engaging a corresponding pin (not shown) on a fastened structure (also not shown in FIG. 1). An internally threaded extension 31 can extend from the flange 29 of the female receiver 14 to threadingly receive the male fastener 12. The flange 29 includes an outer surface 39 that can be mounted substantially flush with a structural wall (not shown), as will be further described in more detail below.

Figure 5:
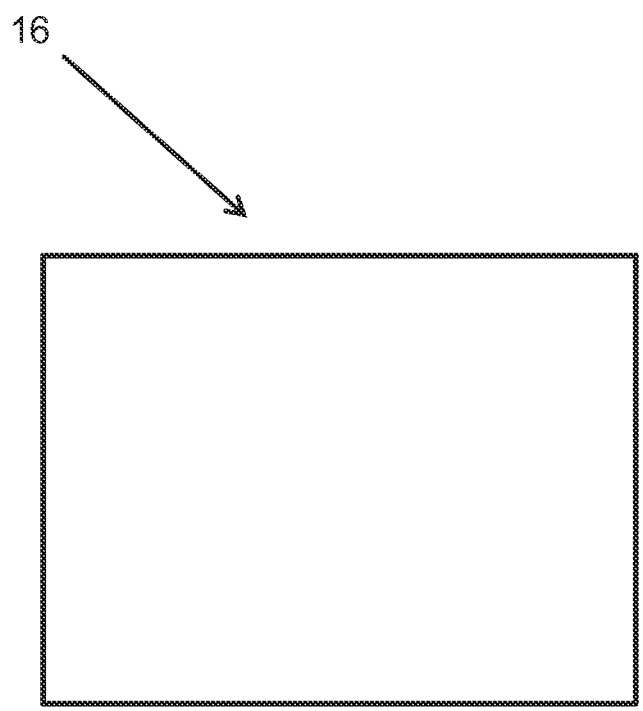
FIG. 5 is cross-sectional view of a portion of a shear ring according to one embodiment of the present disclosure.

A fastener pocket 19 can be formed in a flange 17 of the shear bushing 16. The fastener pocket is constructed to receive the head 13 of the male fastener 12. The fastener pocket 19 can be shaped such that the head 13 of the male fastener 12 can be received and an outer surface 35 of the head 13 can be installed substantially flush with an outer surface 37 of the flange 17 of the shear bushing 16. The shear bushing 16 includes a shear ring 21 extending from the flange 17. The shear ring 21 can be substantially cylindrical in shape and is constructed to receive shear loading exerted into the fastener 10 from a loaded structure. In alternate embodiments, the present invention contemplates a shear ring 21 having non-cylindrical shapes such as portions with linear walls ( an example of which is shown in FIG. 5). In one form, the outer diameter of the shear ring 21 can be equal to or smaller than the outer diameter of the head 13 of the male fastener 12. The outer diameter of the head 13 is defined as the portion of the head 13 that has the largest outer diameter for heads 13 that have variable outer dimensions. In this manner the size of the aperture 34 is minimized for applications that are space constrained due to design requirements. The shear bushing 16 also includes a through aperture 23 for permitting the threaded male fastener 12 to extend therethrough and engage with the female receiver 14.

Figure 2:
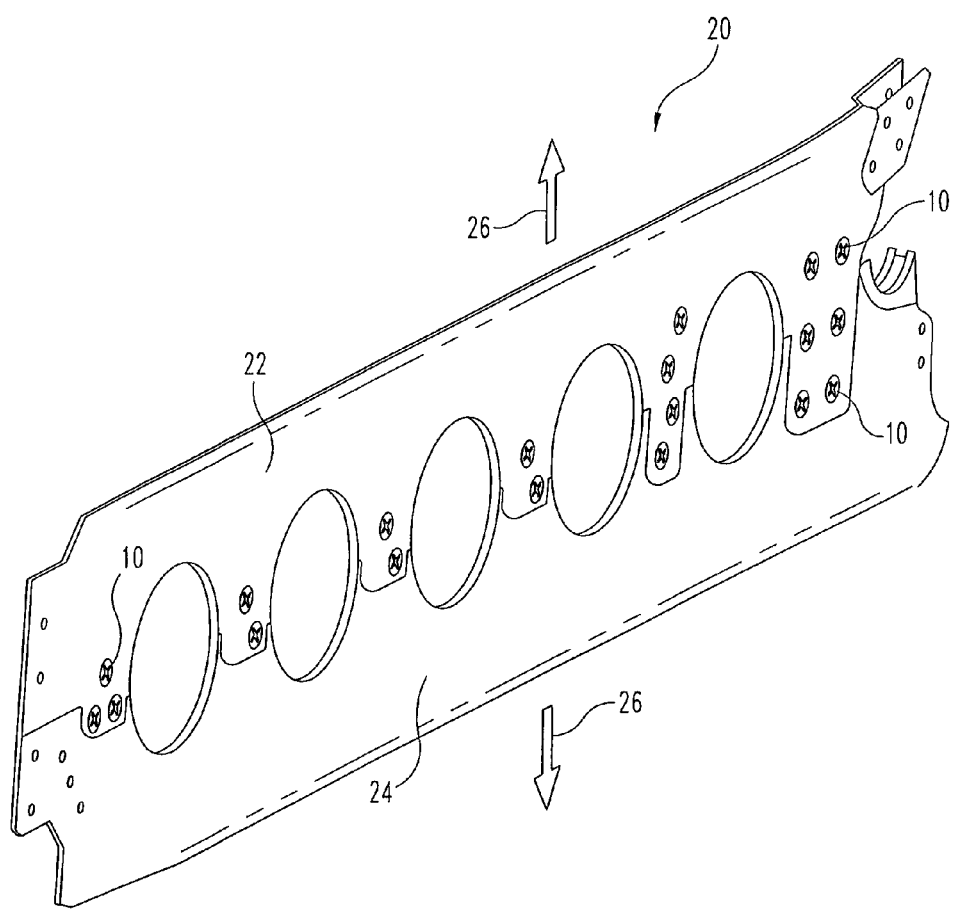
FIG. 2 is a perspective view of a representative structure utilizing the fastener of FIG. 1.

Referring to FIG. 2, an exemplary structure 20 illustrates one embodiment utilizing the fastener 10 of the present invention. The structure 20 can include a coupled pair of components 22, 24 that are connected together by a plurality of fasteners 10. The structure 20 can be loaded under a separating force represented by arrows 26, which translates into a shear load acting on the fasteners 10.

Figure 3:
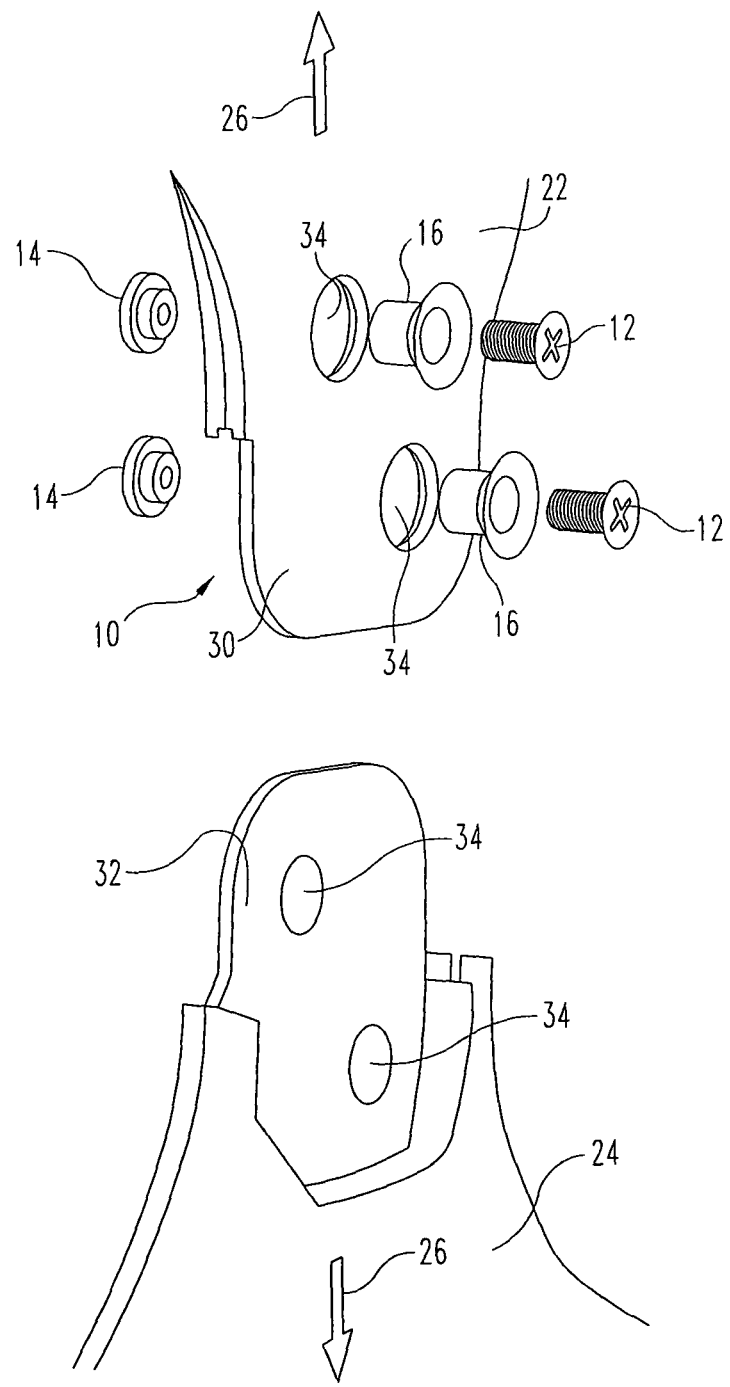
FIG. 3 is an exploded view of a portion of the structure of FIG. 2.

Referring to FIG. 3, an enlarged portion of FIG. 2 is shown in an exploded view. Each component 22, 24 can include a thin walled member such as a tongue 30, 32 respectively, with at least one through aperture 34 formed in each. The tongues 30, 32 are assembled in such a manner that apertures 34 are aligned adjacent one another so that the fastener 10 can be installed through each mating pair of apertures 34 to connect the components 22, 24 together. A shear bushing 16 is inserted through a pair of apertures 34 in the tongues 30, 32 after which a male fastener 12 is placed through the bushing 16 and fastened to a female receiver 14. In an alternate embodiment one of the adjacent through apertures 34 can be tapped with female threads to receive the male fastener 12. In this manner a separate female receiver 14 is unnecessary for the fastener 10 of the present invention.

Figure 4:
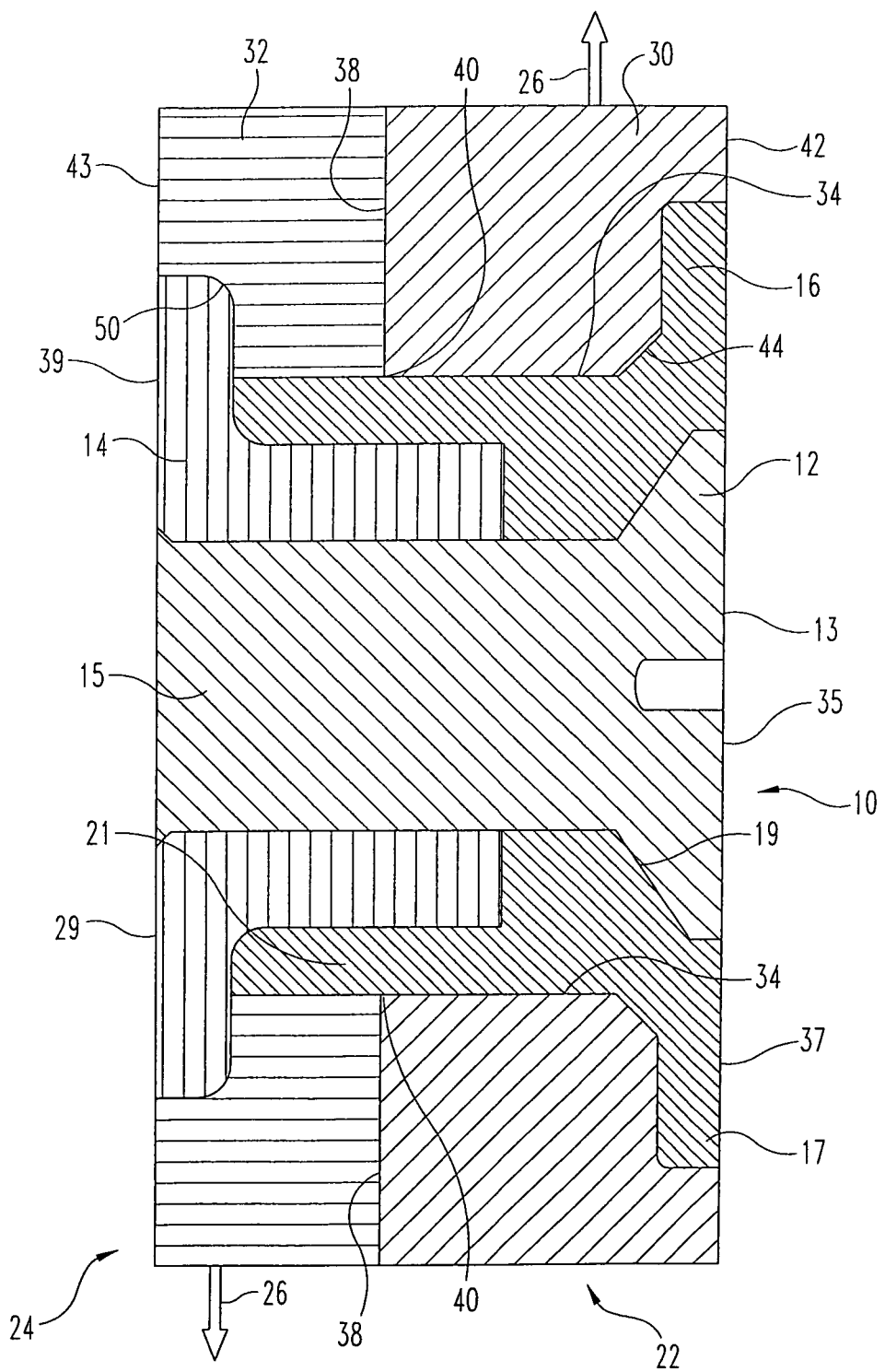
FIG. 4 is a cross sectional view of the fastener and structure of FIG. 2.

Referring to FIG. 4, a cross sectional view of the fastener 10 installed in the tongues 30, 32 of the components 22, 24 respectively. As one skilled in the art can readily appreciate, when the tongues 30 and 32 are loaded as represented by arrows 26 a shear force is transmitted along the interface 38 of the components 22 and 24. The shear force will react at a location 40 where the interface 38 of the components 22, 24 intersects the shear bushing 16. Without the shear bushing 16, the shear force 26 would react through the male fastener 12 and/or the female receiver 14. As explained earlier, male fasteners are typically designed to receive tensile loading through the longitudinal length of their threaded shank. Standard design practice restricts shear loading through the threaded portion of the shank. The shear bushing 16 of the present invention can overcome the shear loading limitations of standard fasteners. The shear bushing 16 can include a shear ring 21 with a wall thickness of less than half of the diameter of the threaded shank 15 of the male fastener 12. The shear bushing 16 is operable to carry more than twice the shear load as the male fastener 12 without the shear ring 21 when using similar materials for the male fastener 12 and the shear ring 21. As long as the shear ring 21 extends across the interface 38 of the components 22, 24 the shear bushing 16 will operate to absorb the entire shear load generated by the components 22, 24 without transmitting any of the shear load to either the male fastener 12 or the female receiver 14.

Although the fastener 10 of the present invention can be advantageously used in any fastening application, the fastener 10 is particularly useful in space constrained applications where the diameter of each through hole 34 is limited in size and where it is desirable to keep the fastener 10 substantially flush with the external walls of the structure or components 22, 24. The male fastener 12 can be constructed to rest substantially flush with a surface or face 42 of the component 22. A bushing pocket 44 can be formed in the component 22 adjacent the through aperture 34 and shaped to receive the flange 17 of the bushing 16. In this manner the flange 17 of the bushing 16 can be seated within the bushing pocket 44 in a substantially flush position such that the outer surface 37 of the flange 17 will not protrude outward from the surface 42 of the structure 22. As described previously, the shear bushing 16 can include a fastener pocket 19 shaped to receive the head 13 of the male fastener 12 such that the outer surface 35 of the head 13 of the male fastener 12 can also rest substantially flush with the face 42 of the component 22. Similarly, the component 24 can have a receiver recess or pocket 50 formed at the opposing end of the through aperture 34 to receive the flange 29 of the female receiver 14. The receiver pocket 50 permits the outer surface 39 of the flange 29 of the female receiver 14 to lie substantially flush with an outer face 43 of the component 24.

While the exemplary embodiment shows the male fastener 12 installed adjacent the flange 17 of the bushing 16, it should be understood by one skilled in the art that the male fastener 12 and the female receiver 14 could be reversed whereby the female receiver 14 could be installed adjacent the flange 17 of the bushing 16 and the male fastener 12 can be installed from the opposing side. Regardless of which side the male fastener 12 or the female receiver 14 is installed in, the shear ring 21 will operate to receive and absorb any shear load from the components 22, 24 without transmitting the shear load to either the male fastener 12 or the female receiver 14. It should also be understood that the fastener 10 can be designed such that one or both ends protrude outside the face 42 or 43 of the components 22, 24 without departing from the scope of the disclosed invention.

One exemplary method for installing the fastener 10 includes aligning through apertures 34 of two or more structures 22, 24 together. In one form the outer structures 22, 24 would include shaped pockets 44 and 50 for the flanges of the shear bushing 16 and the female receiver 14 to rest therein to permit the outer surfaces 35 and 39 of the fastener 10 to be substantially flush with the outer surfaces 42, 43 of the external walls of the structure. The shear bushing 16 can be place through the aligned apertures 34 on one side and female receiver 14 can be installed from the other side. The male fastener 12 is then place through the shear bushing 16 and torqued into the female receiver 14. For applications where the female receiver 14 is a separate nut, anti-rotation features such as aperture 27 (shown in FIG. 1) may be required to prevent the nut 14 from rotating when torquing the male fastener 12. The aperture 27 must be aligned and placed over a mating pin (not shown) on the structure 24 to prevent rotation. In another form a tool is used to prevent the female receiver 14 from rotating during installation. The tool can be of any standard variety or alternatively a specially designed tool. In yet another form, the female receiver 14 is an insert and is fixed to the structure in a conventional manner as one skilled in the art will understand. In another embodiment, one of the outer apertures 34 of the structure include female threads and thus eliminates the need for a separate female receiver 14 such as a nut or an insert. The threaded male fastener 16 can be locked with the female receiver 14 with any of a variety of methods known to those skilled in the art such as with the previously disclosed ovalizing lock feature 25 formed on the female receiver 14.

The male fastener 12, female receiver 14 and the shear bushing 16 of the fastener 10 can be formed from the same material or alternatively can be formed from different materials as desired. The material selection includes metals, metal alloys, composites, metal matrix composites, plastics and combinations thereof.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A fastener comprising:
   a male fastener having a head with a threaded shank extending therefrom;
   a female receiver having a threaded surface complementary to the threaded shank of the male fastener;
   a shear bushing having a shear ring extending from a flange, the shear ring forming a sleeve at least partially around a portion of the threads on the shank of the male fastener;
   wherein a coupling of the shear bushing forms an axial abutment with at least one of the female receiver and the male fastener to discourage relative axial movement of the shear bushing; and
   wherein an end of the threaded shank of the male fastener includes a planar surface which is flush with an outer surface of the female receiver in an installed configuration.

2. The fastener of claim 1, wherein the shear ring receives shear loads and prevents the shear loads from transmitting through the male fastener.

3. The fastener of claim 1, wherein the flange of the shear bushing includes a pocket shaped to receive the head of the male fastener such that an outer surface of the head is substantially flush with an outer surface of the flange of the shear bushing.

4. The fastener of claim 1, wherein the flange of the shear bushing is positionable within a shaped pocket formed within a thin wall such that the outer surface of the flange is substantially flush with an outer surface of the wall.

5. The fastener of claim 1, wherein the female receiver is one of a threaded nut, a threaded insert, and a tapped aperture formed within a thin walled structure.

6. The fastener of claim 1, wherein the female receiver includes a flange constructed to rest adjacent one of the flange of the shear bushing or a wall opposite of the flange of the shear bushing.

7. The fastener of claim 1, wherein an outer surface of the female receiver is flush with an outer surface of a wall.

8. The fastener of claim 1, wherein each end of the fastener is positioned within pockets formed with a structure having opposing thin walls.

9. The fastener of claim 1, wherein the shear ring is installed through an aperture formed between a pair of thin walls positioned adjacent one another and the shear ring extends across an interface between the pair of walls.

10. The apparatus of claim 1, further including an anti-rotation feature formed in the female receiver that prohibits rotation when the male fastener is being threadingly engaged, and wherein the shear ring is non-circular in shape.

11. The fastener of claim 1, wherein each end of the fastener is positioned flush with opposing external surfaces of thin walled structures being fastened together.

12. A fastener for coupling at least two thin walled structures together comprising:
   a shear bushing having an internal through opening and a shear ring constructed and arranged to project across an interface between adjacent walls;
   a male fastener having a threaded portion extending through the shear ring and across the interface of the adjacent walls;
   a threaded female receiver for threadingly engaging the threaded male fastener, the threaded female receiver having an anti-rotation provision operable to engage a corresponding anti-rotation provision in one of the adjacent walls to prevent rotation of the threaded female receiver when being coupled with the male fastener; and
   wherein an end of the threaded portion of the male fastener includes a planar surface which is flush with an outer surface of the female receiver when the fastener is coupled with the at least two thin walled structures.

13. The fastener of claim 12, wherein the shear bushing includes a flange having a pocket shaped to receive a head of one or the other of the male fastener and the female receiver.

14. The fastener of claim 13, wherein the flange is positioned within a shaped pocket formed within one of the thin walls such that an outermost portion of the flange is substantially flush with an external face of the wall.

15. The fastener of claim 12, wherein the female receiver is one of a threaded nut and a threaded insert.

16. The fastener of claim 12, wherein an outer pair of thin walled structures includes a recess for a portion of the fastener to set within.

17. The fastener of claim 12, wherein each end of the fastener is positioned substantially flush with an external face of the outer walls of the structure.

18. The fastener of claim 12, wherein the shear bushing absorbs shear loads from the thin walled structures and prevents shear loads from being transferred through a threaded portion of the fastener.

19. The apparatus of claim 12, wherein the threaded female receiver includes a locking feature to discourage relative movement with the male fastener, and wherein the shear ring includes a non-cylindrical surface structured to receive a shear load.

20. A method of fastening a structure having at least two thin walls under shear loading comprising the steps of:

forming a through aperture between thin walls positioned adjacent one another;

placing a shear bushing through the aperture with a portion of the shear bushing extending across an interface of the adjacent thin walls;

positioning a threaded male fastener through an inner opening of the shear bushing such that a portion of the threads extend across the interface of the adjacent thin walls;

threadingly engaging the male fastener with a female receiver such that an end of the male fastener includes a planar surface which is flush with an outer surface of the female receiver when coupled with the at least two thin walls; and discouraging rotation of the female receiver through interaction with an anti-rotation feature of one of the adjacent thin walls.

21. The fastener of claim 20, further comprising the step of:
positioning the fastener such that outer surfaces of the faster are flush with outer surfaces of the structure.

22. The method of claim 20, further comprising the step of:
transferring the shear load from the thin walls into the shear bushing.

23. The method of claim 20, further comprising the step of:
preventing the shear load from acting through the threads of the fastener.

24. The method of claim 20, which further includes:
reacting a shearing force between the thin adjacent walls with a non-cylindrical surface of the shear bushing; and
locking the female receiver relative to the male fastener to prevent relative movement.

* * * * *